US 9,392,538 B2

(12) United States Patent
Gresset et al.

(10) Patent No.: US 9,392,538 B2
(45) Date of Patent: Jul. 12, 2016

(54) AUTOMATED WIRELESS CHANNEL CHANGING

(71) Applicant: Verizon Patent and Licensing Inc., Arlington, VA (US)

(72) Inventors: Jacques Gresset, Charlotte, NC (US); Sunil D. Limbasia, Irving, TX (US); Abhilash Paul, Irving, TX (US); Srinivas Tatavarty, Irving, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 142 days.

(21) Appl. No.: 14/260,122

(22) Filed: Apr. 23, 2014

(65) Prior Publication Data

US 2015/0312833 A1    Oct. 29, 2015

(51) Int. Cl.
  *H04W 40/00*    (2009.01)
  *H04W 84/12*    (2009.01)
  *H04W 72/12*    (2009.01)
  *H04W 36/20*    (2009.01)
  *H04W 48/20*    (2009.01)
  *H04W 48/00*    (2009.01)

(52) U.S. Cl.
  CPC .............. *H04W 48/17* (2013.01); *H04W 36/20* (2013.01); *H04W 48/20* (2013.01); *H04W 72/1226* (2013.01); *H04W 84/12* (2013.01)

(58) Field of Classification Search
  None
  See application file for complete search history.

(56) References Cited

U.S. PATENT DOCUMENTS

| 5,933,420 | A  | * | 8/1999  | Jaszewski | H04W 16/14  |
|           |    |   |         |           | 370/329     |
| 8,966,018 | B2 | * | 2/2015  | Bugwadia  | G06F 9/4411 |
|           |    |   |         |           | 709/220     |
| 2003/0051008 | A1 | * | 3/2003 | Gorthy   | H04L 41/0226 |
|           |    |   |         |           | 709/220     |
| 2014/0095677 | A1 | * | 4/2014 | Croy     | H04L 41/0843 |
|           |    |   |         |           | 709/220     |
| 2014/0226501 | A1 | * | 8/2014 | Zhou     | H04W 24/10  |
|           |    |   |         |           | 370/252     |
| 2014/0379881 | A1 | * | 12/2014 | Bradley | G06F 13/00  |
|           |    |   |         |           | 709/221     |
| 2015/0117228 | A1 | * | 4/2015 | Daub     | H04W 72/082 |
|           |    |   |         |           | 370/252     |

OTHER PUBLICATIONS

Author Unknown, How To: Change the Channel of Your Wireless Network, Jan. 11, 2013, pp. 1-5.*

(Continued)

*Primary Examiner* — Christopher Crutchfield (57) ABSTRACT

A user device may determine wireless channel load values for multiple wireless channels, each wireless channel load value indicating a load, of the corresponding wireless channel, due to wireless activity by a set of network devices that does not include a first network device connected to the user device; display information regarding the wireless channel load values, the information including an indication of a recommended one of the plurality of wireless channels; receive a selection to change a first wireless channel of the plurality of channels, via which the user device and the network device communicate, to a second wireless channel of the plurality of channels; determine computer code corresponding to a particular model of the first network device; and execute the determined computer code to interact with the first network device to change the wireless channel from the first wireless channel to the second wireless channel.

20 Claims, 10 Drawing Sheets

(56) References Cited

OTHER PUBLICATIONS

Author Unknown, ManageEngine WiFi Manager, as retrieved using Internet Archive, www.archive.org, as archived on Nov. 20, 2008, pp. 1-123.*

"Channel Deployment Issues for 2.4-Ghz 802.11 WLANs", 2004 (available at http://www.cisco.com/c/en/us/td/docs/wireless/technology/channel/deployment/guide/Channel.html, visited Mar. 25, 2014).

* cited by examiner

AUTOMATED WIRELESS CHANNEL CHANGING

BACKGROUND

A user device may wirelessly connect with a particular network access point via a wireless channel. The quality of the wireless channel may vary based on factors such as the presence of other network access points and/or other user devices wirelessly connecting with other network access points. In order to reduce connection performance degradation a user may manually access the particular network access point to change the wireless channel used by the particular network access point.

DETAILED DESCRIPTION OF THE PREFERRED EMBODIMENTS

The following detailed description refers to the accompanying drawings. The same reference numbers in different drawings may identify the same or similar elements.

Systems and/or methods, as described herein, may provide a technique to display wireless channel load information (e.g., load on wireless channels caused by activity of wireless network devices within a communication range of a user device), and to automate the change of a wireless channel setting of a network device connected to the user device. For example, a user of the user device (e.g., a smart phone), using a single application, may view the wireless channel load information and select to change the wireless channel setting. Further, the wireless channel setting may be changed via the application without requiring the user to log in and directly interact with a network device (e.g., a Wi-Fi access point) that provides the wireless network. In some implementations, the application may monitor load values for wireless channels, and may change the wireless channel setting, without user interaction, when load values of other wireless channels are less than the load value of a currently selected wireless channel (e.g., a wireless channel via which the user device and the network device communicate).

Figure 1A:
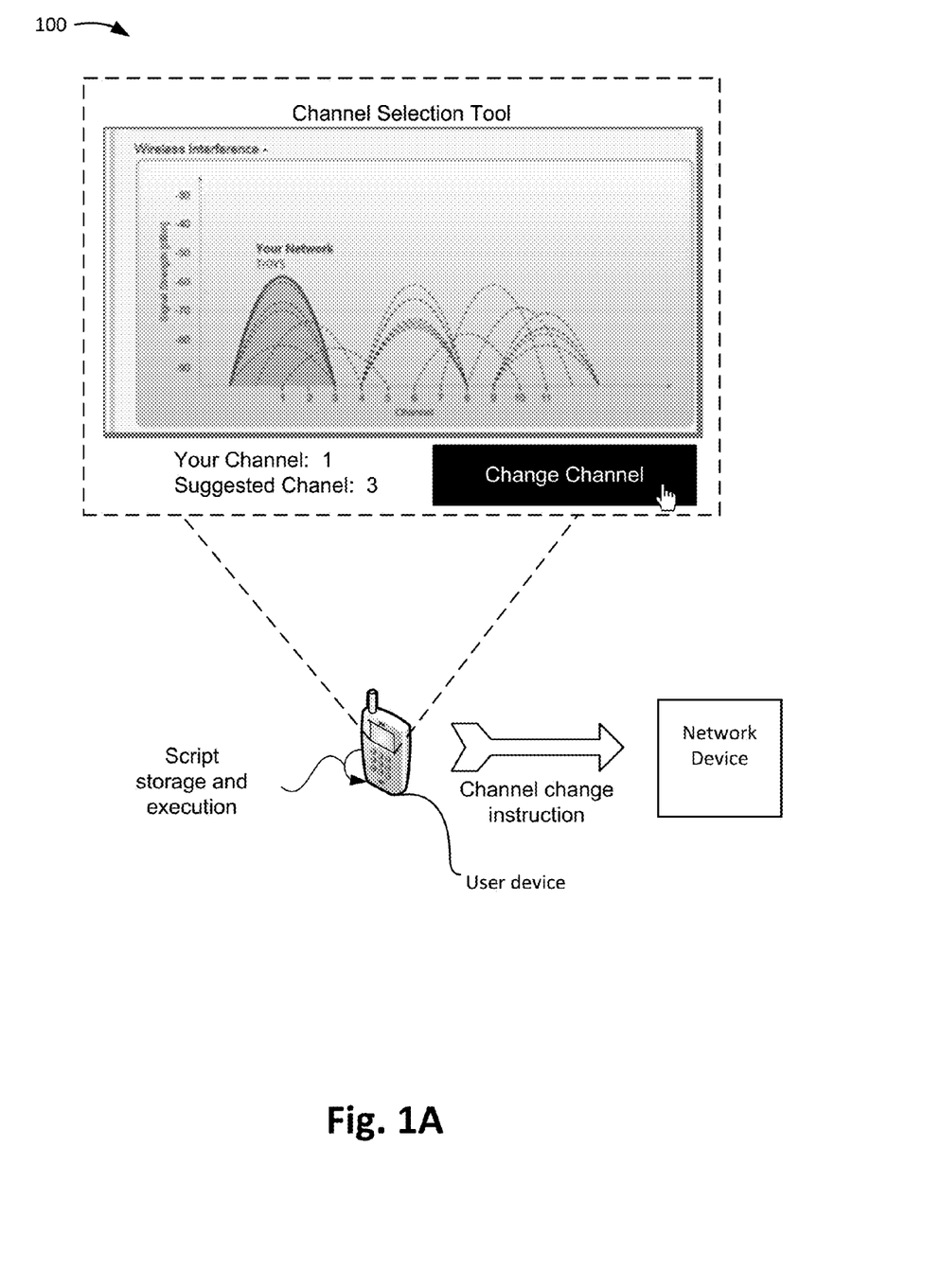
FIGS. 1A and 1B illustrate an example overview of an implementation described herein.

FIG. 1A illustrates an example overview of an implementation described herein. As shown in FIG. 1A, a user device may display wireless channel load information (interface 100) associated with wireless channels via which network devices output wireless signals. For example, the user device may display wireless channel load information received by a network adapter of the user device.

As shown in interface 100, the user device may display the wireless channel load information as signal strength curves. Each signal strength curve may indicate the signal strength of a beacon frame signal being broadcast by a particular network device and received by the user device. The user device may also display a signal strength curve indicating the signal strength of a connection signal via which the user device and a connected network device communicate. A signal strength curve whose peak is located at a particular wireless channel may indicate the corresponding network device is broadcasting a beacon frame signal via the particular wireless channel. For example, a signal strength curve, whose peak is located at wireless channel 1, may indicate that a particular network device is broadcasting a beacon frame signal via wireless channel 1. As shown in FIG. 1A, the graph may display how signal strength curves interfere with other channels. For example, as shown, a number of network devices are illustrated as broadcasting on channel 1. Accordingly, there may be significant interference when attempting to connect, to a particular network device, using this channel.

Based on beacon signal strength values, the user device may identify a least-loaded wireless channel based on a minimum amount of overlap with channels being broadcast by network devices. For example, the user device may calculate load associated with each wireless channel, and rank the wireless channels based on the calculated load values. In some implementations, the user device may calculate a load value for a particular wireless channel by summing beacon frame signal strength values associated with the particular wireless channel (i.e., signals associated with other network devices that are broadcasting via the particular channel) and by summing signal strength measurements associated with neighboring wireless channels (i.e., signals associated with other network devices that are broadcasting via other channels). When summing signal strength measurements associated neighboring wireless channel, these signal strength values may be reduced based on a distance (e.g., frequency difference) between the particular wireless channel and the neighboring wireless channels. The user device may suggest a wireless channel based on determining that the load of a currently selected wireless channel is higher than the other wireless channel.

As shown in FIG. 1A, a user of the user device may select to change the wireless channel to the suggested wireless channel. Based on receiving the selection, the user device may communicate with the network device to automatically change the wireless channel setting without requiring the user to manually access the network device in order to change the wireless channel setting. For example, the user device may execute a script to automatically interact with the desired network device to change the wireless channel setting of the desired network device. As a result, the user may view wireless channel load information and select to change the wireless channel setting within one application and without needing to manually access the desired network device to change the wireless channel setting.

In some implementations, the user device may execute the script to change the wireless channel setting without receiving a selection to change the wireless channel setting. For example, the user device may continuously monitor channel load, and may execute the script to change the channel when load of a current channel is greater than load of another channel.

Figure 1B:
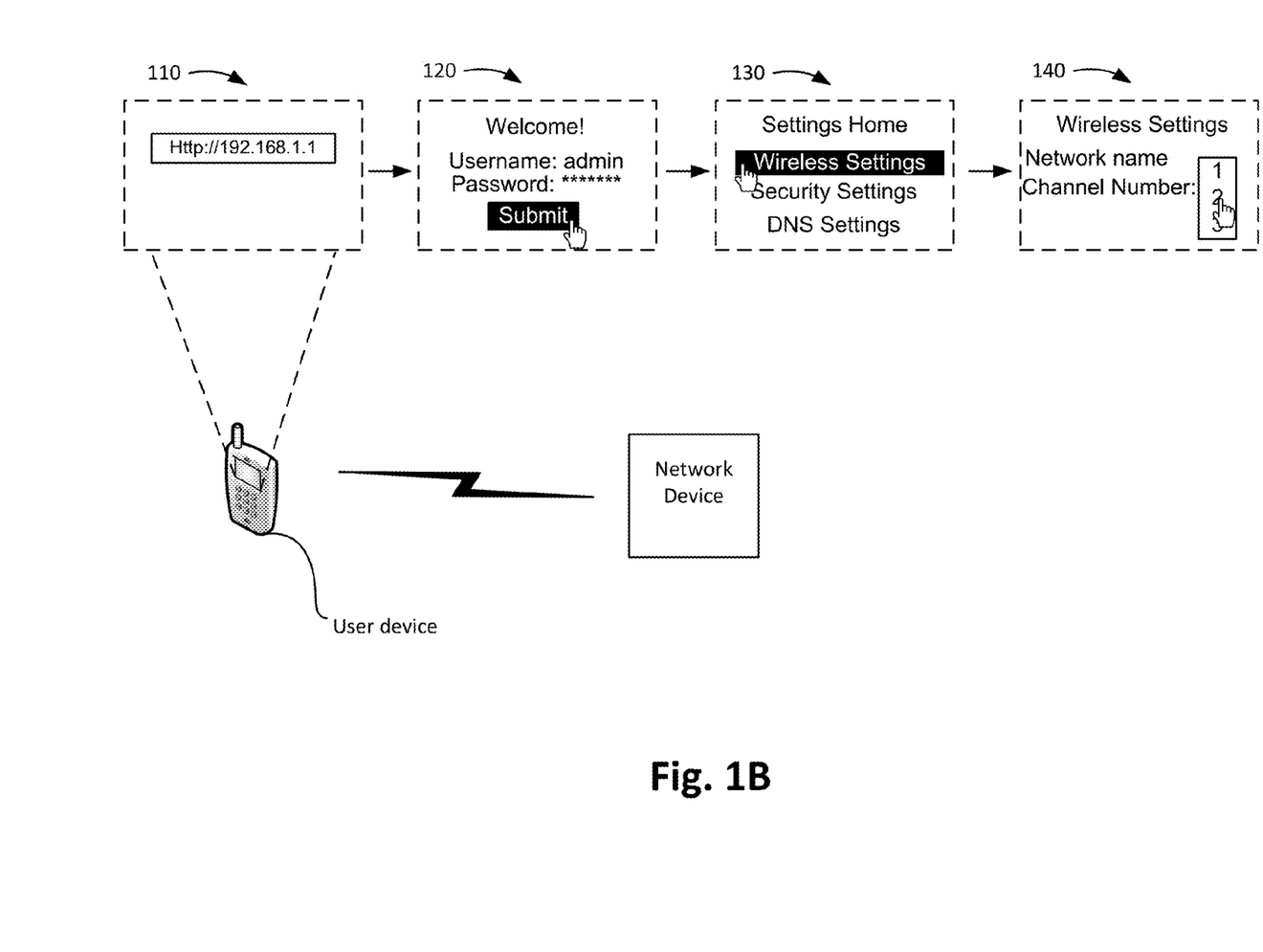

FIG. 1B illustrates an example where changing wireless channel settings without requiring the user to manually access the network device may be desirable. As shown in interface 110 of FIG. 1B, a user may input a local address of the network device in a web browser of the user device in order to manually access the network device via the web browser. The user device may present a login screen of the network device, and the user may input login credentials (interface 120). Based on receiving valid login credentials, the network device may provide access to a main settings page (interface 130). From the main settings page, the user may select a wireless settings page to access an option to change the wireless channel (interface 140). Based on receiving a selection to change the wireless channel, the network device may reboot, and the user device may need to re-log in to the network device in order to modify additional settings of the network device (e.g., by entering the local address of the network device in the web browser in order to access the login page).

Figure 2:
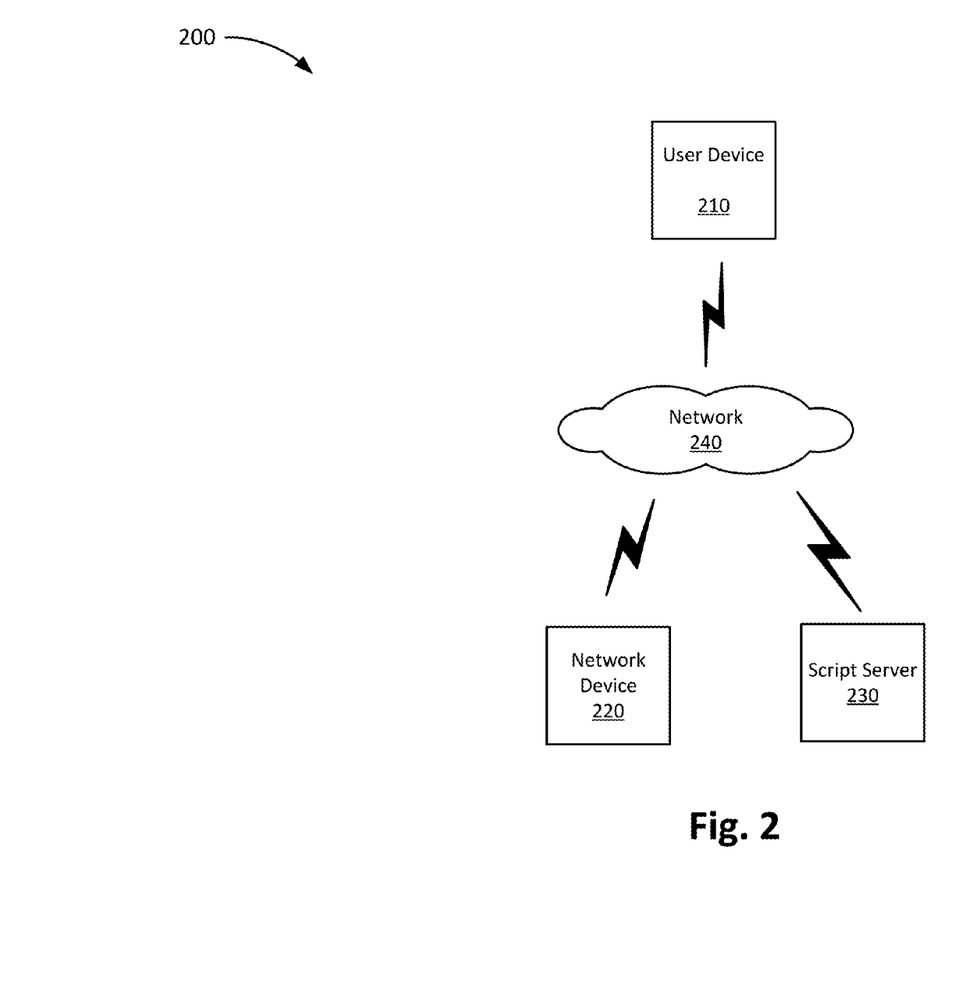
FIG. 2 illustrates an example environment in which systems and/or methods, described herein, may be implemented.

FIG. 2 is a diagram of an example environment 200 in which systems and/or methods described herein may be implemented. As shown in FIG. 2, environment 200 may include user device 210, network device 220, script server 230, and network 240.

User device 210 may include a device capable of communicating via a network, such as network 240. For example, user device 210 may correspond to a mobile communication device (e.g., a smart phone or a personal digital assistant (PDA)), a portable computer device (e.g., a laptop or a tablet computer), a gaming device, a desktop computer device, or another type of device.

In some implementations, user device 210 may receive beacon frame signals output by one or more network devices 220, such as or more other network devices 220 that do not include the network device to which the user is interested in connecting or the network device to which user device 210 is currently connected. For example, user device 210 may include a wireless network adapter that may continuously receive these beacon frame signals. In some implementations, user device 210 may determine the signal strength of each beacon frame signal (e.g., in units of decibels meters (dBms)). Based on the beacon frame signal strengths, user device 210 may calculate wireless channel load values that identify an amount of load on each wireless channel associated with the received beacon frame signal strengths.

User device 210 may implement an application that displays information regarding beacon frame signal strengths and/or the wireless channel load values. User device 210 may present an option to change the wireless channel setting (e.g., when the wireless channel load of a currently selected wireless channel is higher than the wireless channel load of another wireless channel). User device 210 may execute a script to change a wireless channel setting on network device 220 (e.g., based on receiving, from a user of user device 210 and via a user interface of the application, a selection to change the wireless channel setting). Additionally, or alternatively, user device 210 may execute the script (e.g., without user interaction) when the wireless channel load value, of a currently selected wireless channel, exceeds a threshold or is higher than the load value of another wireless channel. User device 210 may receive the script (e.g., from script server 230) based on a model number associated with network device 220.

Network device 220 may include a wireless network device or a combined wired and wireless network device that may wirelessly communicate with one or more user devices 210. In some implementations, network device 220 may include a wireless access point, a wireless router, or the like. In one implementation, network device 220 may implement a Wi-Fi-based wireless access point. Network device 220 may transmit network traffic to and/or from user device 210 via network 240 and via a wireless channel. In one implementation, wireless channels may be Wi-Fi wireless channels in the 2 gigahertz (GHz) band and that each channel may have a bandwidth of approximately 22 Mhz and be spaced approximately 5 megahertz (MHz) apart. In some implementations, network device 220 may be configurable via a web-based (e.g., HTTP) interface. Network device 220 may periodically or intermittently output beacon frame signals to announce the presence of a wireless access point to which user device 210 may connect.

Network device 220 may be actively connected to user device 210 via a connection signal (e.g., in order to transmit traffic to and/or from user device 210). Environment 200 may also include one or more neighboring network devices 220 that may not be actively connected to user device 210, but may broadcast beacon frames that user device 210 may receive via beacon frame signals. The activity of a neighboring network device 220 (e.g., traffic and/or beacon frame transmission activity) may increase wireless channel load on a particular wireless channel via which network device 220 transmits traffic and/or beacon frames. The activity of the neighboring network device 220 may also increase wireless channel load on neighboring wireless channels.

Script server 230 may include one or more computing devices, such as a server device or a collection of server devices. In some implementations, script server 230 may store scripts for different model network devices. Different models of network devices 220 may include different web interfaces (e.g., different HTML forms may be presented to configure the various options of the network devices), and thus, a different script may be needed to modify settings on network devices 220 of different models. Script server 230 may store information identifying a particular model of network device 220 associated with a particular user and/or with a particular internet protocol (IP) address. Script server 230 may provide, to user device 210, based on receiving information identifying a model number of a network device 220 via which user device 210 communicates. Script server 230 may maintain current scripts for a particular model of network device 220.

Network 240 may include one or more wired and/or wireless networks. For example, network 240 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, network 240 may include a local area network (LAN), a wireless LAN (WLAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

The quantity of devices and/or networks in environment is not limited to what is shown in FIG. 2. In practice, environment 200 may include additional devices and/or networks; fewer devices and/or networks; different devices and/or networks; or differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
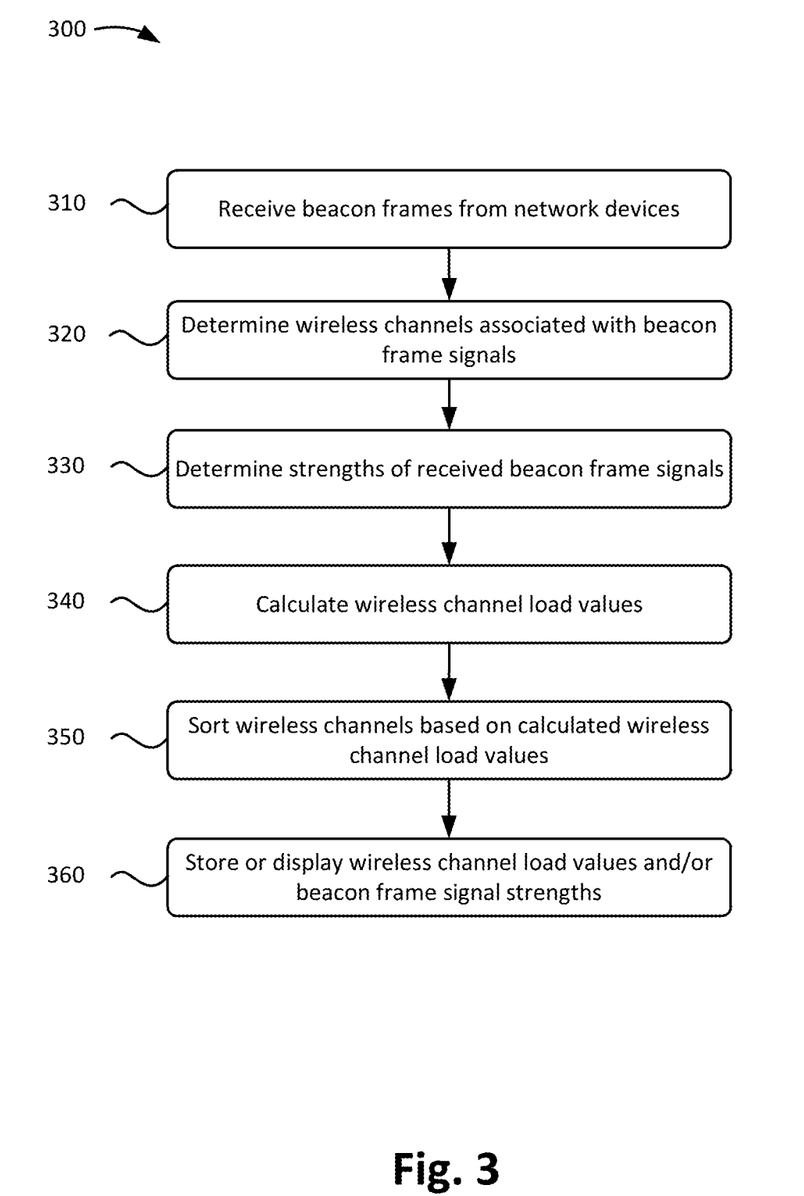
FIG. 3 illustrates a flowchart of an example process for calculating wireless channel load and displaying wireless channel load values and/or beacon frame signal strengths.

FIG. 3 illustrates a flowchart of an example process 300 for calculating wireless channel load and displaying wireless channel load values and/or beacon frame signal strengths. In some implementations, process 300 may be performed by user device 210. In some implementations, some or all of blocks of process 300 may be performed by one or more other devices.

As shown in FIG. 3, process 300 may include receiving beacon frames from network devices (block 310). For example, user device 210 may receive beacon frames from network devices 220 as network devices 220 broadcast these beacon frames in order to announce the presence of access points associated with corresponding network devices 220. The beacon frames may be received via corresponding beacon frame signals.

Process 300 may further include determining wireless channels associated with the beacon frame signals (block 320). For example, user device 210 may determine the wireless channels based on the wireless channels on which the beacon frame signals are broadcast.

Process 300 may also include determining the strengths of the received beacon frame signals (block 330). For example, user device 210 may determine the strength of the received beacon frame signals using a wireless network adapter of user device 210.

Process 300 may further include calculating wireless channel load values (block 340). For example, user device 210 may calculate the load on each wireless channel associated with the received beacon frame signals. For a particular wireless channel, user device 210 may calculate the wireless load value based on the formula:

$$L = \Sigma_{n=1}^{x} \alpha_n A_n$$

where A is the amplitude or signal strength of a beacon frame signal associated with a network device 220, $\alpha_n$ is a weighting factor, and the sum is taken over all the received beacon frame signals (except the beacon frame signal corresponding to a network device 220 to which user device 210 is attempting to connect or is already connected). In one implementation, the weighting factor may be based on the inverse of the frequency distance between the particular wireless channel and the channel n. For example, when the beacon frame signal strength corresponds to the same channel as the particular wireless channel, the weighting factor may be one. When the beacon frame signal strength corresponds to an adjacent channel as the particular wireless channel, the weighting factor may be 0.5; when the signal strength corresponds to a channel distance, the weighting factor may be 0.25, etc. That is, the wireless load for a particular wireless channel may be the sum of the beacon frame signal strengths associated with that particular wireless channel, in addition to the beacon frame signal strengths of other wireless channels. The beacon frame signal strengths of the other wireless channels may be reduced based on the distance between the particular wireless channel and the other wireless channels. User device 210 may calculate the wireless load for each wireless channel associated with the received beacon frame signals.

Process 300 may also include sorting the wireless channels based on the calculated wireless channel load values (block 350). For example, user device 210 may sort the wireless channel load values (e.g., in ascending order).

Process 300 may further include storing or displaying the wireless channel load values and/or the beacon frame signal strengths (block 360). For example, user device 210 may graphically display the beacon frame signal strengths as signal strength curves (e.g., as shown in FIG. 1A). Additionally, or alternatively, user device 210 may graphically display a connection signal strength of a network device 220 connected with user device 210 (e.g., as shown below with respect to FIG. 7A). In some implementations, user device 210 may graphically display the beacon frame signal strengths and/or the connection signal strength in real time (e.g., based on the signal strengths of these signals as determined by the wireless network adapter of user device 210). In some implementations, user device 210 may display the wireless load values in a chart (e.g., in ascending order), and may present a suggestion, to the user of user device 210, to change the wireless channel setting on a connected network device 220 to a wireless channel having a lower wireless load value.

Figure 4:
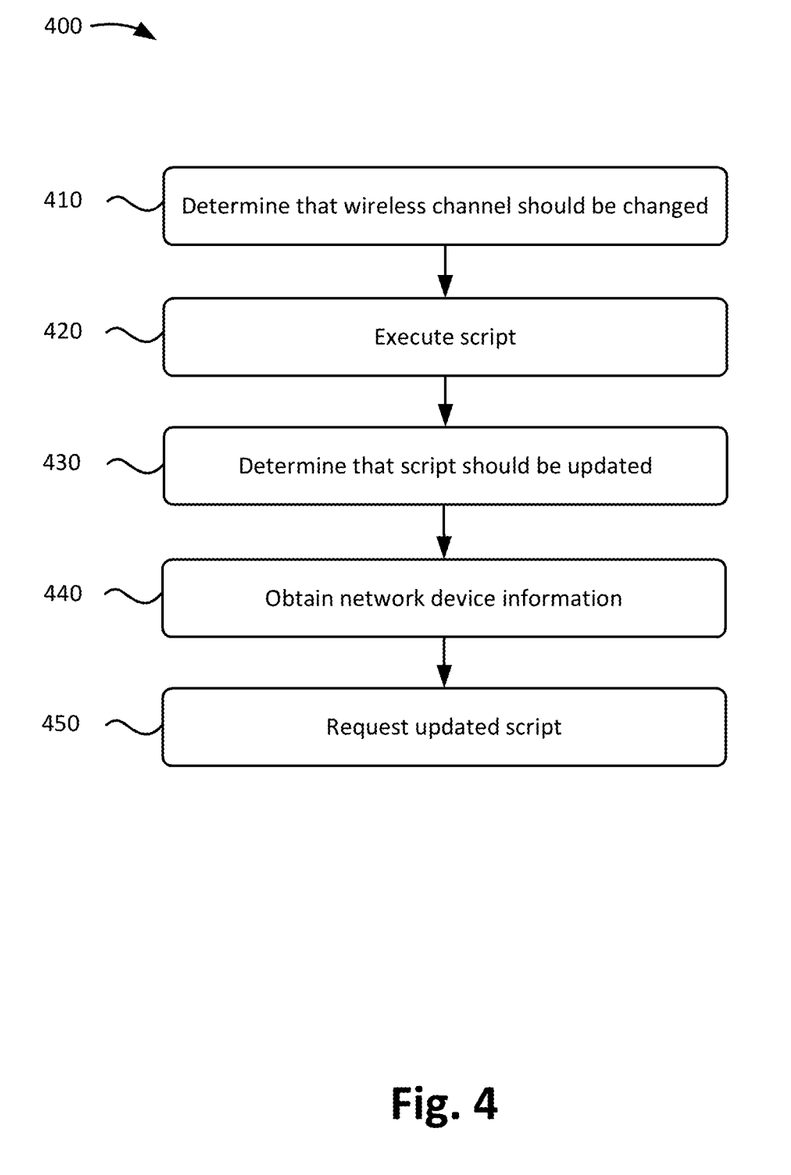
FIG. 4 illustrates a flowchart of an example process for changing a channel setting on a network device.

FIG. 4 illustrates a flowchart of an example process 400 for changing a channel setting on a network device. In some implementations, process 400 may be performed by user device 210. In some implementations, some or all of blocks of process 400 may be performed by one or more other devices. In FIG. 4, assume that user device 210 stores a script for a model of a network device 220 connected to user device 210.

As shown in FIG. 4, process 400 may include determining that a wireless channel should be changed (block 410). For example, user device 210 may determine that the wireless channel setting, of a network device 220 connected to user device 210, should be changed. In some implementations, user device 210 may determine that the wireless channel setting of network device 220 should be changed based on receiving a selection, from a user of user device 210, to change the wireless channel. As described above with respect to FIG. 3, user device 210 may implement an application that displays real-time beacon frame signal strength measurements and/or wireless channel load values (e.g., in the form of signal strength curves, a list of total wireless load values associated with each wireless channel, etc.). In some implementations, user device 210 may receive the selection to change the wireless channel via a user interface associated with the application. For example, the user may select to change the wireless channel (e.g., to a wireless channel having less load than the currently selected wireless channel) based on the displayed information. The user's selection may identify the user's desired wireless channel (e.g., a destination wireless channel).

As described in greater detail below with respect to FIG. 7A, a user of user device 210 may view the signal strength of a connection signal between user device 210 and a connected network device 220 as the user travels from one location to another. For example, the user may view connection signal strength information as the user moves from one portion of their house or office to another portion. The user may select to change the wireless channel based on real-time connection signal strength information that may change as the user moves (e.g., with user device 210) from one location to the other. In some implementations, user device 210 may determine, without user interaction, that the wireless channel setting of network device 220 should be change.

Figure 5:
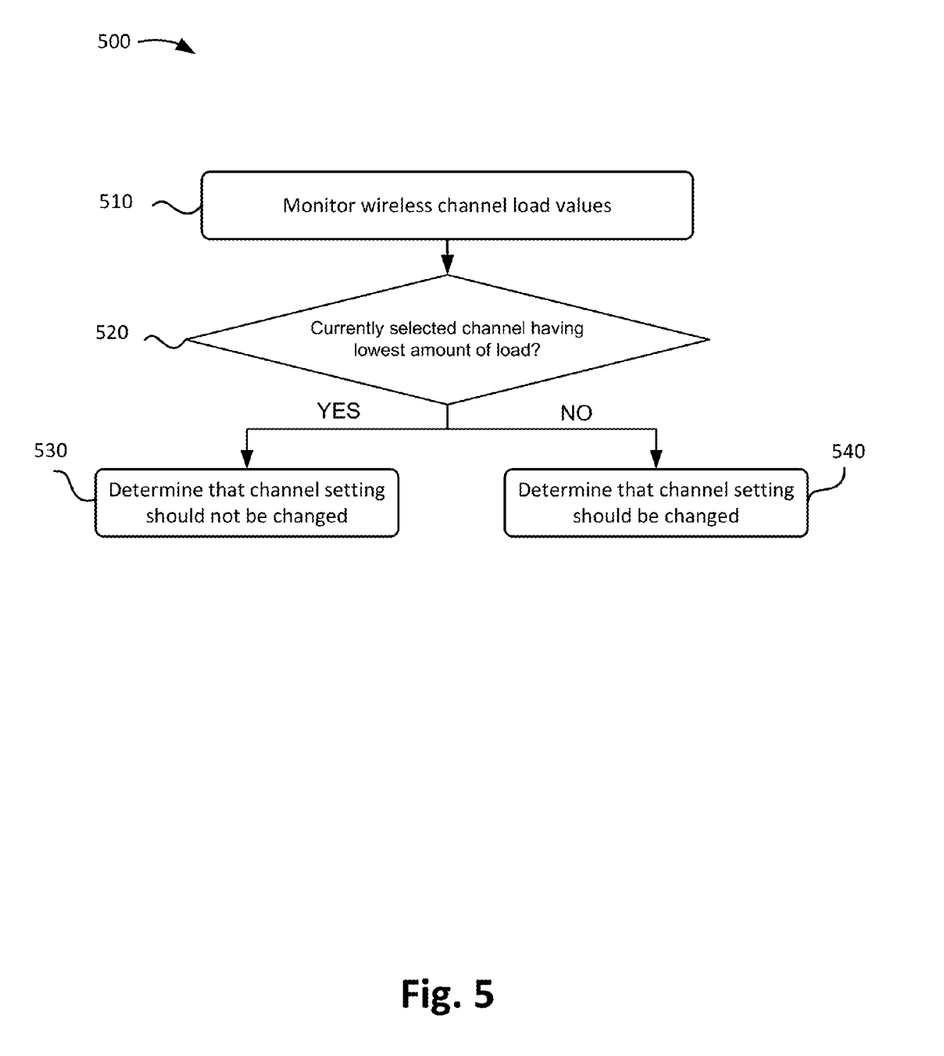
FIG. 5 illustrates a flowchart of an example process for determining, without user interaction, that the wireless channel setting of a network device should be changed.

FIG. 5 illustrates a flowchart of an example process 500 for determining, without user interaction, that the wireless channel setting of network device 220 should be changed. In some implementations, process 500 may be performed by user device 210. In some implementations, some or all of blocks of process 500 may be performed by one or more other devices.

Some or all of blocks of process 500 may correspond to processes associated with block 310.

As shown in FIG. 5, process 500 may include monitoring wireless channel load values (block 510). For example, user device 210 may continuously receive beacon frame signals from network devices 220, and may determine the strengths of these received beacon frame signals associated with each wireless channel. Further, user device 210 may continuously calculate wireless channel load based on the beacon frame signal strengths, in accordance with process 300 as described above.

User device 210 may implement a background application to continuously monitor the wireless channel load values. Alternatively, user device 210 may not continuously monitor wireless load values, but may calculate wireless load values by request from the user, or based on a location of user device 210. For example, as described in greater detail below with respect to FIG. 7A, user device 210 may calculate wireless load values when user device 210 is located in an area that has been identified as a highly congested area.

Process 500 may also include determining whether a currently selected channel has the amount of lowest load (block 520). For example, user device 210 may determine whether the currently selected wireless channel (e.g., the channel via which user device 210 and network device 220 communicate) has the lowest amount of load out of other wireless channels in a wireless spectrum via which user device 210 and network device 220 may communicate. Alternatively or additionally, user device 210 may determine whether the currently selected wireless channel has an amount of load that is below a threshold level.

If, for example, user device 210 determines that the currently selected channel has the lowest amount of load (block 520-YES), process 500 may include determining that the channel setting should not be changed (block 530). If, on the other hand, user device 210 determines that the currently selected channel does not have the lowest amount of load (block 520-NO), process 500 may include determining that the channel setting should be changed (block 540). User device 210 may determine that the channel setting should be changed to the channel having the lowest amount of load (e.g., a destination wireless channel).

Returning to FIG. 4, process 400 may include executing a script to change the wireless channel (block 420). The script may include a script that is customized for the particular network device. For example, user device 210 may execute the script, associated with a model of network device 220, based on determining that the wireless channel should be changed. In some implementations, the script may interact with network device 220 using a web-browser (e.g., HTTP) interface provided by network device 220 (e.g., by using HTTP GET and POST methods).

Figure 6:
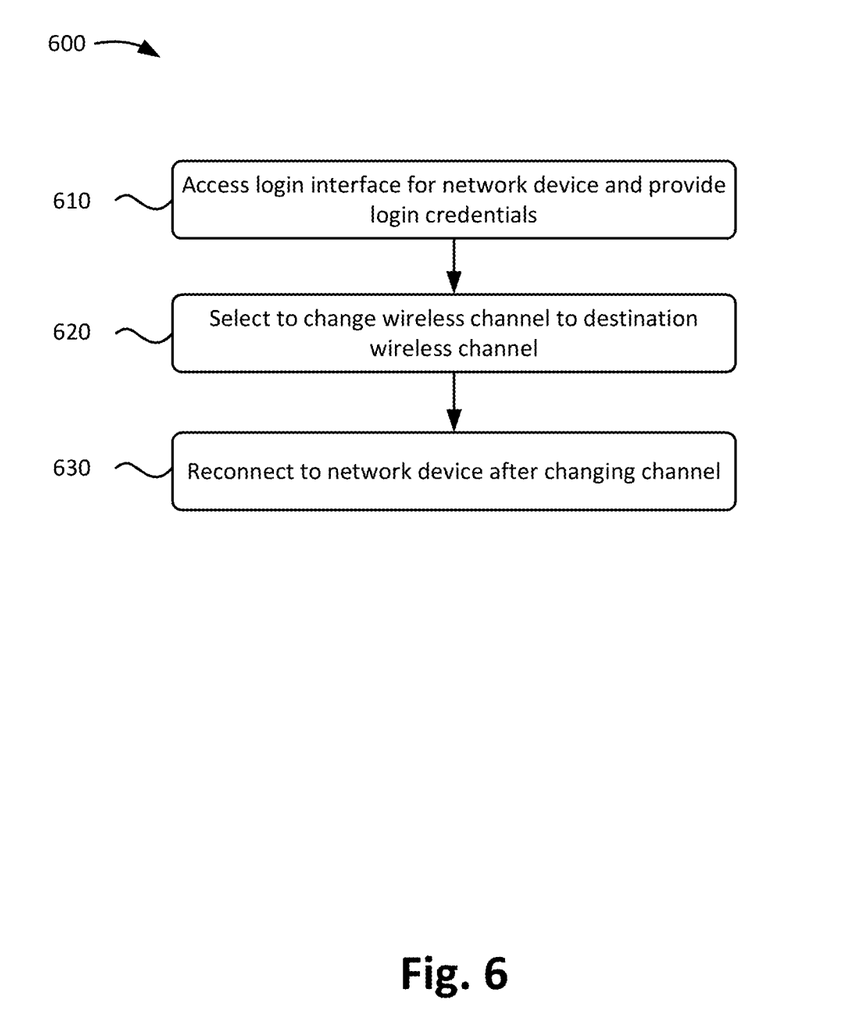
FIG. 6 illustrates a flowchart an example process for executing a script.

FIG. 6 illustrates a flowchart an example process 600 for executing the script. In some implementations, process 600 may be performed by user device 210. In some implementations, some or all of blocks of process 600 may be performed by one or more other devices. Some or all of blocks of process 600 may correspond to processes associated with block 320.

As shown in FIG. 6, process 600 may include accessing a login interface for the network device and providing login credentials (block 610). For example, user device 210 may access the login interface of network device 220 using an HTTP communication request including a local address of network device 220. User device 210 may then provide, to network device 220, login credentials. In some implementations, the login credentials may be stored within the script. Additionally, or alternatively, the user of user device 210 may provide login credentials when accessing the application that displayed wireless load information.

Process 600 may further include selecting a destination wireless channel (block 620). For example, user device 210 may access a wireless settings section associated with the API of network device 220. As described above, the script may identify a link or other location identifier to the wireless settings section. User device 210 may then select to change the wireless channel to the destination wireless channel (e.g., the user's selected wireless channel or the determined wireless channel having the lowest amount of load).

Process 600 may also include reconnecting to the network device (block 630). For example, based on selecting to change the wireless channel, network device 220 may reboot and may disconnect from user device 210 after rebooting. User device 210 may rescan the wireless spectrum and identify network device 220 once network device 220 has completely rebooted and has begun to broadcast a beacon frame signal. User device 210 may automatically reconnect to user device 210 without requiring the user to manually select to scan for network device 220, and select to connect to network device 220.

In some implementations, process 600 may automate those tasks shown in FIG. 1B in which the user may need to manually enter the local address of network device 220 into a web browser, enter in the login credentials, select the wireless settings section, select the destination wireless channel, and re-login to network device 220 to continue to modify settings on network device 220. Process blocks of 600 may be performed by user device 210 without displaying web pages and/or information regarding HTML responses received from network device 220.

As a result, the user may view wireless channel load information within an application that displays the wireless channel load information and select to change the wireless channel setting from within that same application, and without needing to manually access network device 220 in order to change the wireless channel setting. In some implementations, the application may run in the background of script server 230 to monitor wireless channel load, and execute the script (e.g., without user involvement) to change the wireless channel when a different wireless channel, other than the currently selected wireless channel, has a lower amount of load.

Returning to FIG. 4, process 400 may also include determining that the script should be updated (block 430). For example, user device 210 may determine that the script should be updated if, after executing the script, the wireless channel setting did not change. User device 210 may determine that the wireless channel setting did not change if user device 210 and network device 220 continue to communicate via the previously selected wireless channel. In some implementations, user device 210 may determine that the script should be updated based on an HTML response received from network device 220 when executing the script. If the HTML response does not include information indicating that the wireless channel setting change was successful, user device 210 may determine that the script should be updated. Additionally, or alternatively, user device 210 may determine that the script should be updated based on some other technique.

Process 400 may further include obtaining network device information (block 440). For example, user device 210 may obtain network device information by logging in to network device 220. In some implementations, user device 210 may identify information of network device 220 after logging in to network device 220. For example, user device 210 may identify the media access control (MAC) address of network device 220, a serial number of network device 220, a model number of network device 220, and/or some other information regarding network device 220.

Process 400 may also include requesting an updated script (block 450). For example, user device 210 may request an updated script from script server 230. In some implementations, the request may include the network device information. Alternatively, the request may not include the network device information (e.g., if user device 210 is unsuccessful in obtain the network device information), but may include some other information that script server 230 may use to identify a model identifier of network device 220 and a corresponding script associated with the model identifier. For example, the request may include an IP address via which the request was provided (e.g., an IP address of network device 220). Additionally, or alternatively, the request may include user information that may identify the model identifier of network device 220 (e.g., when network device 220 is supplied by a service provider that stores information associating the model identifier of network device 220 with the user information). Additionally, or alternatively, the request may include some other information that script server 230 may use to identify a script associated with network device 220. Based on receiving the request and identifying the particular script, script server 230 may provide the script to user device 210, and user device 210 may store the script for future use.

Figure 7A:
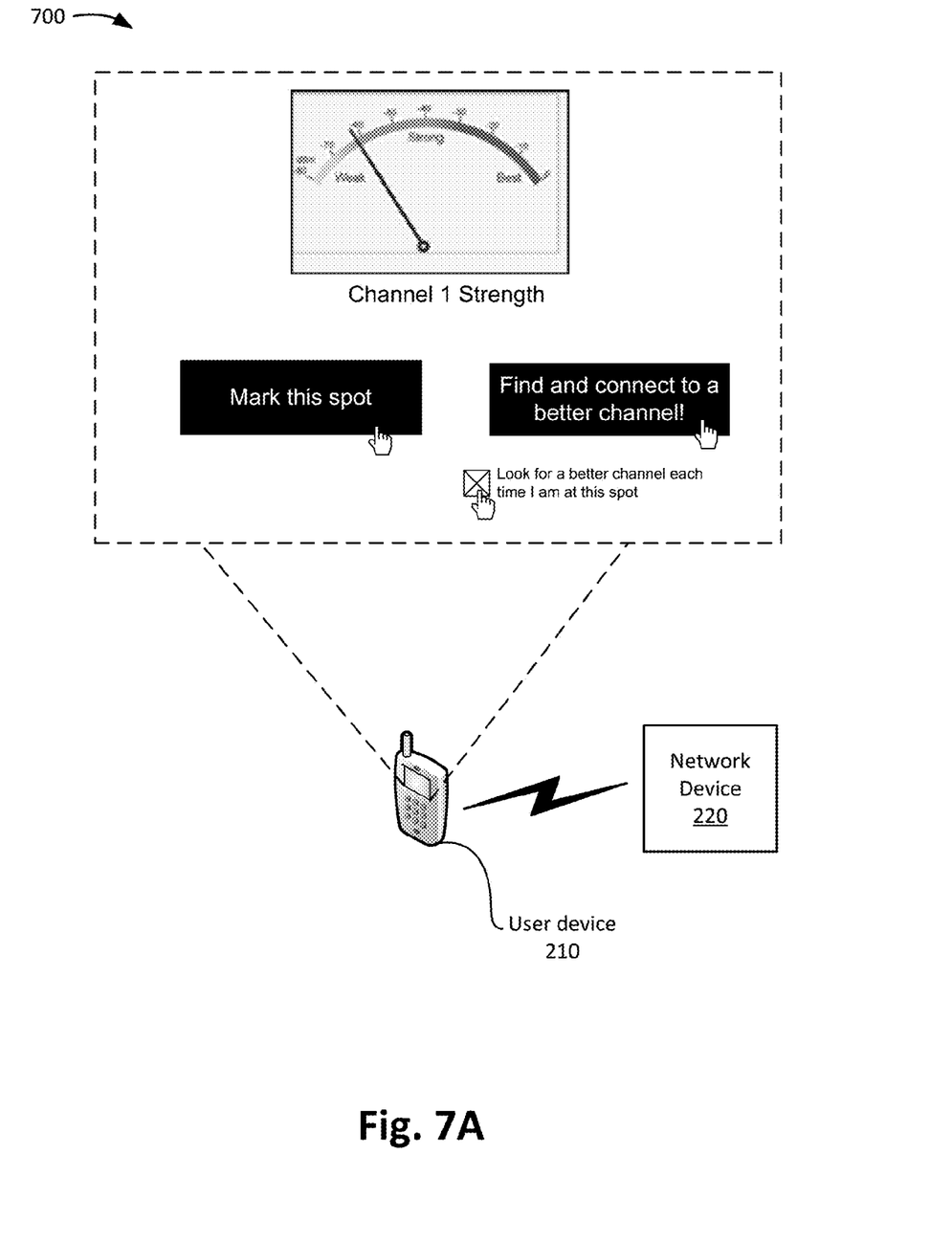
FIGS. 7A and 7B illustrate an example implementation for displaying wireless load measurements and presenting an option to change a wireless channel setting to a suggested wireless channel.
Figure 7B:
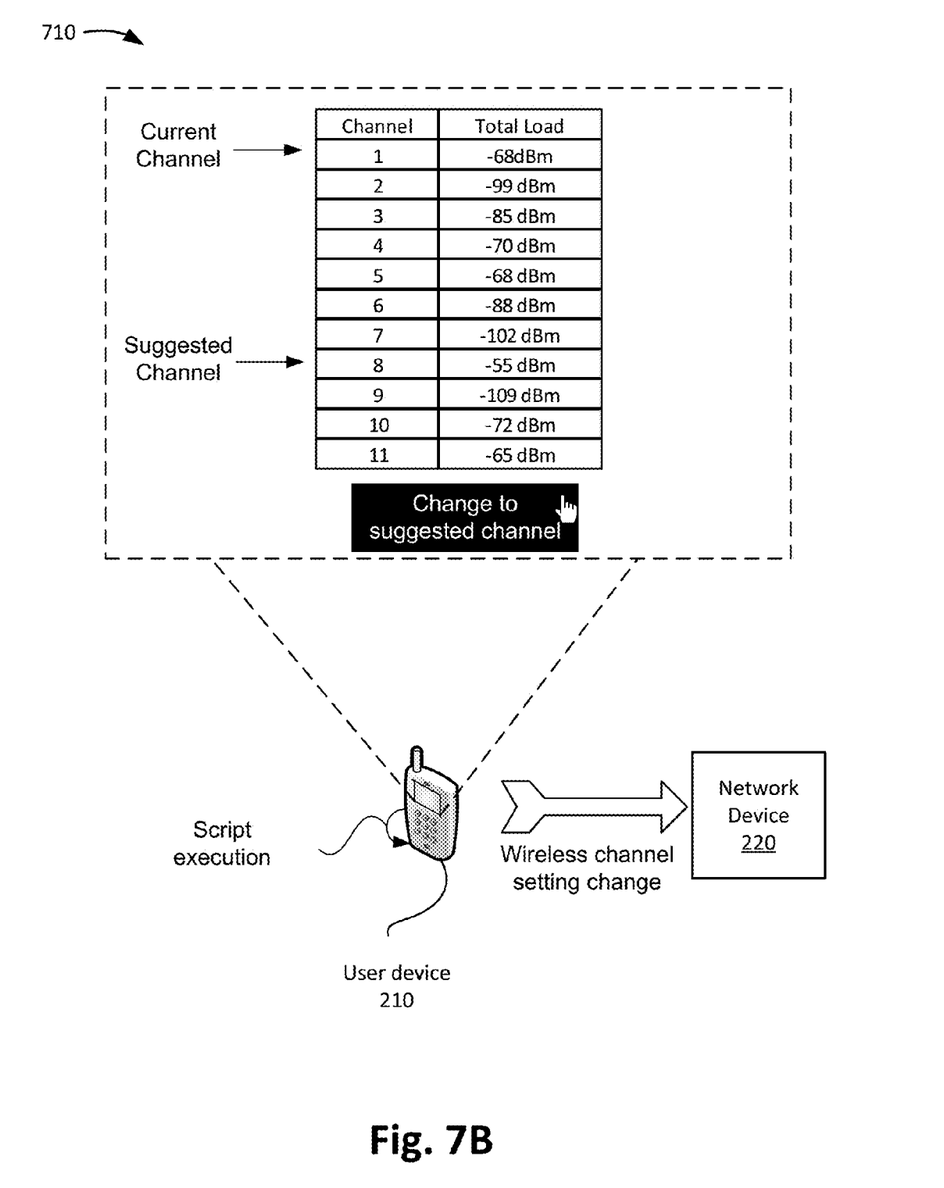

FIGS. 7A and 7B illustrate an example implementation for displaying wireless load information and presenting an option to change the wireless channel setting to a suggested wireless channel. As shown in FIG. 7A, user device 210 may display (e.g., in interface 700), a signal strength associated with a connection signal via which user device 210 and network device 220 communicate. User device 210 may also display the wireless channel associated with the connection signal. The connection signal strength may be represented in units of dBm. In some implementations, a user of user device 210 may mark a geographic position associated with the connection signal strength (e.g., to mark areas where the connection signal strength may be weak).

As further shown in interface 700, user device 210 may present an option to search for wireless channels having less load (thereby yielding stronger signal strength) than the wireless channel associated with the connection signal. User device 210 may also present an option to search for wireless channels having a lower amount of load each time user device 210 is located in the marked geographic position. As described above with respect to process block 510, user device 210 may calculate wireless channel load when user device 210 is located in an area that has been identified as a high load area (e.g., a marked spot).

Referring to FIG. 7B, user device 210 may present (e.g., in interface 710), wireless channel load information in the form of a chart that identifies wireless channel load for each wireless channel (e.g., wireless channels 1-11). In some implementations, the wireless channel load may be based on beacon frame signals received by user device 210. User device 210 may suggest, to the user, to select a wireless channel having the lowest amount of load. User device 210 may receive, from the user, a selection to change the wireless channel setting. Based on receiving the selection, user device 210 may execute a script that may cause network device 220 to change the wireless channel setting.

Figure 8:
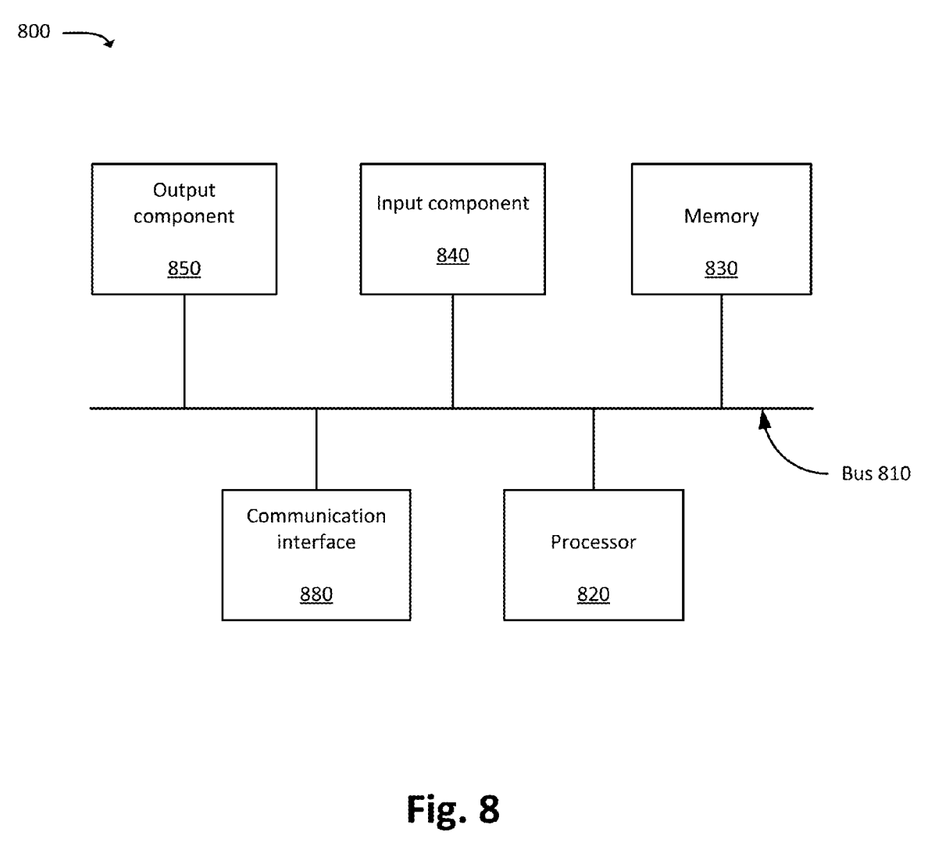
FIG. 8 illustrates example components of one or more devices, according to one or more implementations described herein.

FIG. 8 is a diagram of example components of device 800. One or more of the devices described above (e.g., with respect to FIGS. 1B, 2, 7A, and 7B) may include one or more devices 800. Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more light emitting diodes (LEDs), etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared (IR) receiver, a Bluetooth® radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while series of blocks have been described with regard to FIGS. 3-6, the order of the blocks may be modified in other implementations. Further, non-dependent blocks may be performed in parallel.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown (e.g., in FIGS. 1, 2, 7A, and 7B), in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

Some implementations are described herein in conjunction thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, satisfying a threshold (or similar terms) may be used interchangeably with "being greater than a threshold," "being greater than or equal to a threshold," "being less than a threshold," "being less than or equal to a threshold," or other similar terms, depending on the context in which the threshold is used.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
   determining, by a user device that is wirelessly connected to a first network device, wireless channel load values for a plurality of wireless channels, each wireless channel load value indicating a load, of the corresponding wireless channel, due to wireless activity by a set of network devices that does not include the first network device;
   displaying, by the user device, information regarding the wireless channel load values, the information including an indication of a recommended one of the plurality of wireless channels;
   receiving, by the user device, a selection to change a first wireless channel of the plurality of channels, via which the user device and the network device communicate, to a second wireless channel of the plurality of channels;
   determining, by the user device, computer code corresponding to a particular model of the first network device; and
   executing, by the user device, the determined computer code to interact with the first network device to change the wireless channel from the first wireless channel to the second wireless channel.

2. The method of claim 1, wherein executing the computer code includes:
   accessing a login interface of the first network device;
   providing login credentials to the first network device via the login interface; and
   selecting to change to the second wireless channel based on providing the login credentials.

3. The method of claim 2, wherein accessing the login interface, providing the login credentials, and selecting to change to the second wireless channel, is performed via a hypertext transfer protocol (HTTP) interface.

4. The method of claim 1, wherein determining the wireless channel load value for a particular wireless channel, of the plurality of wireless channel includes:
   determining signal strength values for beacon frame signals received by the user device;
      the beacon frame signals and the corresponding signal strength values each being associated with a wireless channel via which the corresponding beacon frame signal is received by the user device;
   applying a value by each of the signal strength values,
      the value being based on a frequency distance between a wireless channel associated with the signal strength and the particular wireless channel; and
   summing each signal strength value after applying the value.

5. The method of claim 1, wherein displaying the wireless load information includes displaying a table of a total amount of wireless load for each of the plurality of wireless channels or displaying signal strength curves corresponding to beacon frame signals detected by the user device.

6. The method of claim 1, further comprising:
   determining, out of the plurality of wireless channels, a particular wireless channel having the lowest wireless channel load value,
   wherein displaying the information regarding the wireless channel load values includes displaying an indication of the particular wireless channel as the recommended one of the plurality of wireless channels,
   wherein receiving the selection to change the first wireless channel includes receiving a selection to change the first wireless channel to the particular wireless channel,
      the particular wireless channel corresponding to the second wireless channel and to the recommended one of the plurality of wireless channels.

7. The method of claim 1, further comprising:
monitoring the wireless channel load values; and
determining that a load value of the first wireless channel is higher than the load value of the second wireless channel,
wherein executing the computer code is based on determining that the load value of the first wireless channel is higher than the load value of the second wireless channel, and without being based on displaying or receiving the selection to change the first wireless channel.

8. The method of claim 1, further comprising:
determining that the computer code should be updated based on a response received from the first network device when executing the computer code; and
requesting updated computer code.

9. A system comprising:
a user device, comprising:
 a non-transitory memory device storing:
  a plurality of processor-executable instructions; and
 a processor configured to execute the processor-executable instructions, wherein executing the processor-executable instructions causes the processor to:
  determine wireless channel load values for a plurality of wireless channels, each wireless channel load value indicating a load, of the corresponding wireless channel, due to wireless activity by a set of network devices that does not include a first network device connected to the user device;
  display information regarding the wireless channel load values, the information including an indication of a recommended one of the plurality of wireless channels;
  receive a selection to change a first wireless channel of the plurality of channels, via which the user device and the network device communicate, to a second wireless channel of the plurality of channels;
  determine computer code corresponding to a particular model of the first network device; and
  execute the determined computer code to interact with the first network device to change the wireless channel from the first wireless channel to the second wireless channel.

10. The system of claim 9, wherein executing the processor-executable instructions, to execute the computer code, causes the processor to:
 access a login interface of the first network device;
 provide login credentials to the first network device via the login interface; and
 select to change to the second wireless channel based on providing the login credentials.

11. The system of claim 10, wherein executing the processor-executable instructions, to access the login interface, provide the login credentials, and select to change to the second wireless channel, causes the processor to access the login interface, provide the login credentials, and select to change to the second wireless channel via a hypertext transfer protocol (HTTP) interface.

12. The system of claim 9, wherein executing the processor-executable instructions, to determine the wireless channel load value for a particular wireless channel, of the plurality of wireless channel, causes the processor to:
 determine signal strength values for beacon frame signals received by the user device;
  the beacon frame signals and the corresponding signal strength values each being associated with a wireless channel via which the corresponding beacon frame signal is received by the user device;
 apply a value by each of the signal strength values,
  the value being based on a frequency distance between a wireless channel associated with the signal strength and the particular wireless channel; and
 sum each signal strength value after applying the value.

13. The system of claim 9, wherein executing the processor-executable instructions, to display the wireless load information, causes the processor to display a table of a total amount of wireless load for each of the plurality of wireless channels or to display signal strength curves corresponding to beacon frame signals detected by the user device.

14. The system of claim 9, wherein executing the processor-executable instructions causes the processor to:
 determine, out of the plurality of wireless channel, a particular wireless channel having the lowest wireless channel load value,
 wherein executing the processor-executable instructions, to display the information regarding the wireless channel load values, causes the processor to display an indication of the particular wireless channel as the recommended one of the plurality of wireless channels,
 wherein executing the processor-executable instructions, to receive the selection to change the first wireless channel, causes the processor to receive a selection to change the first wireless channel to the particular wireless channel,
  the particular wireless channel corresponding to the second wireless channel and to the recommended one of the plurality of wireless channels.

15. The system of claim 9, wherein executing the processor-executable instructions causes the processor to:
 monitor the wireless channel load values; and
 determine that a load value of the first wireless channel is higher than the load value of the second wireless channel,
 wherein executing the processor-executable instructions, to execute the script, causes the processor to execute the computer code based on determining that the load value of the first channel is higher than the load value of the second wireless channel, and without being based on displaying or receiving the selection to change the first wireless channel.

16. The system of claim 9, wherein executing the processor-executable instructions causes the processor to:
 determine that the computer code should be updated based on a response received from the first network device when executing the computer code; and
 request an updated computer code.

17. A method comprising:
 determining, by a user device that is wirelessly connected to a first network device, wireless channel load values for a plurality of wireless channels, each wireless channel load value indicating a load, of the corresponding wireless channel, due to wireless activity by a set of network devices that does not include the first network device;
 selecting, by the user device and based on the wireless channel load values, a particular wireless channel of the plurality of wireless channels;
 determining a model of the first network device;
 selecting, based on the determined model of the first network device, a particular computer code of a plurality of computer codes;
 executing, by the user device and based on selecting the particular wireless channel, the particular computer code to cause the first network device to change the wireless channel from a current wireless channel to the particular wireless channel, the executing including interacting with the first network device though a hypertext transfer protocol (HTTP) interface provided by the first network device; and reconnecting, by the user device, to the first network device via the particular wireless channel.

18. The method of claim 17, further comprising:
displaying information regarding the wireless channel load values within an application;
receiving, from a user of the user device via the application, a selection to change from the current wireless channel to the particular wireless channel,
wherein selecting the particular wireless channel is based on receiving, from the user, the selection to change from the currently wireless to the particular wireless channel.

19. The method of claim 17, further comprising:
monitoring the wireless channel load values; and
determining that a load value of the current wireless channel is higher than the load value of the particular wireless channel,
wherein executing the computer code is based on determining that the load value of the current wireless channel is higher than the load value of the particular wireless channel.

20. The method of claim 17, wherein executing the particular computer code includes:
accessing a login interface of the first network device;
providing login credentials to the first network device via the login interface; and
selecting to change to the second wireless channel based on providing the login credentials.

* * * * *